July 16, 1968     W. W. AHERN ET AL     3,392,495
SPHERICAL STRUCTURAL ARRANGEMENT
Filed Jan. 22, 1965     4 Sheets-Sheet 1

INVENTORS
WILLIAM W. AHERN
WILLIAM H. WAINWRIGHT
BY,
*Russell, Chittick & Pfund*
ATTORNEYS INVENTORS
WILLIAM W. AHERN
WILLIAM H. WAINWRIGHT
BY,
Russell, Chittick & Pfund
ATTORNEYS United States Patent Office 3,392,495
Patented July 16, 1968

3,392,495
SPHERICAL STRUCTURAL ARRANGEMENT
William W. Ahern, Belmont, and William H. Wainwright, Cambridge, Mass., assignors to Geometrics, Inc., Cambridge, Mass., a corporation of Massachusetts
Filed Jan. 22, 1965, Ser. No. 427,380
3 Claims. (Cl. 52—81)

ABSTRACT OF THE DISCLOSURE

A generally spherically shaped support structure comprised of a plurality of interconnected elongated elements. The elements, which are limited to four standard lengths, are arranged in a plurality of re-occurring patterns defining a combination of triangular openings, the latter also being limited to four standard configurations.

---

This invention relates to an improved frame construction for self-supporting spherical enclosures, and is particularly concerned with structures of the type commonly referred to as "radomes."

Radomes may be designed either as air-supported or self-supporting structures, depending on the requirements of a particular installation. An air-supported radome has a simpler and more open frame structure due to the auxiliary support which the enclosure receives from its pressurized interior. On the other hand, a self-supporting radome must of necessity be provided with a more concentrated array of structural elements because the frame structure alone is responsible for supporting the entire enclosure.

Where self-supporting radomes are utilized, care must be taken to properly arrange the structural frame elements in order to avoid imparting adverse effects to the radar equipment enclosed therein. To explain, the most commonly utilized radome construction is one that assumes a generally spherical shape approximating that of a regular or nearly regular polyhedron. These spherical shapes have been found ideally suited for withstanding severe climatic conditions such as those prevailing in arctic regions. However, experience has indicated that in structures of this type, parallelism must be avoided when arranging frame elements. Failure to do so will result in the antenna characteristics of enclosed radar equipment being distorted to an unacceptable degree. To avoid these unfavorable results, radomes are usually constructed with basic frameworks arranged in accordance with a predetermined random geometric pattern instead of a substantially regular lattice. In this manner a parallel arrangement of frame elements is either completely avoided or in the alternative, reduced to an absolute minimum.

Although successful to a considerable extent in avoiding the unacceptable distortion of antenna characteristics, the aforementioned random disposition of structural elements has in the past raised other problems which in many instances substantially increased the overall cost of a particular radome installation. For example, it should be obvious that an infinite number of random geometric patterns may be produced by simply varying the lengths of individual structural elements. However, a wide variation in the lengths or sizes of individual structural elements complicates subsequent assembly of the structure, thereby considerably increasing both the time required for assembly and the attending labor costs. In addition, since most radomes are shipped in a disassembled state to remote construction sites where they are subsequently assembled, a wide range of different sized components will invariably result in more difficult logistical problems. Thus it can be seen that with conventional self-supporting radome constructions which employ a random distribution of multi-sized structural elements, serious problems frequently arise in connection with their shipment and final assembly at the radar sites. This is particularly true of radomes which are to be finally assembled under adverse climatic conditions.

It is therefore an object of the present invention to provide a self-supporting radome construction with a random distribution of structural elements, which construction may be efficiently assembled without the aforementioned difficulties caused by a wide range of multi-sized structural components.

Another object of the present invention is to provide a radome construction which employs a minimum number of different-sized structural components without adversely affecting the subsequent performance of radar equipment enclosed therein.

A still further object of the present invention is to provide a random distribution for the basic structural elements of a substantially spherical radome construction, said structural elements being dimensionally subdivided into four basic groups.

A further object of the present invention is to obviate many of the problems previously associated with the transportation and assembly of radome constructions employing a random distribution of differently dimensioned structural elements.

These and other objects of the present invention will become more apparent as the description proceeds with the aid of the accompanying drawings in which.

Figure 1:
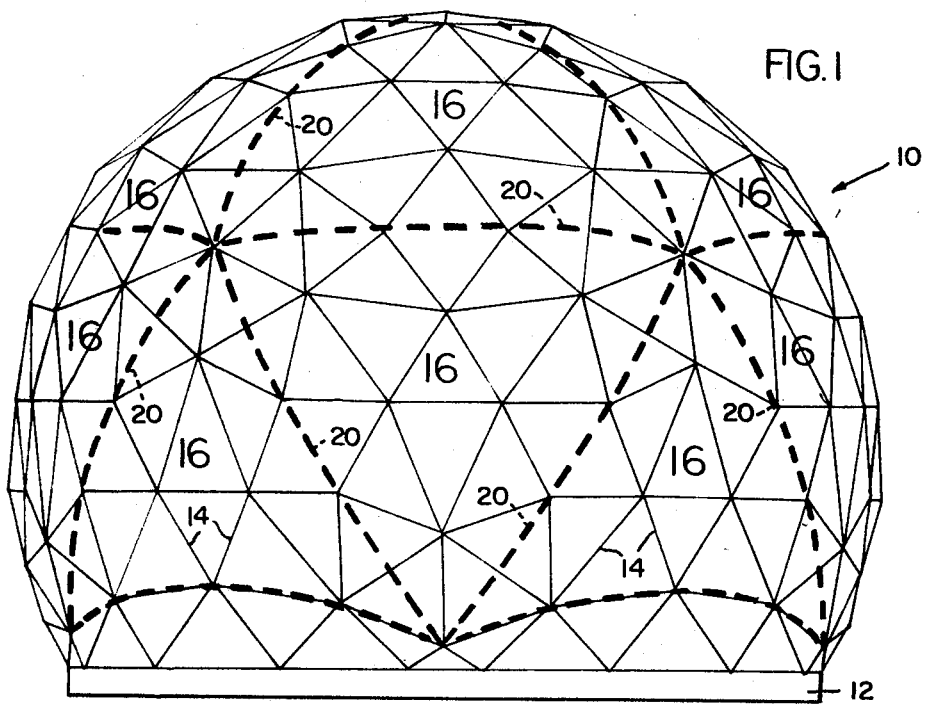
FIG. 1 is a diagrammatic view in side elevation of a radome frame construction embodying the principles of the present invention.

Referring initially to FIG. 1, the basic framework of a substantially spherical self-supporting radome generally indicated by the reference numeral 10 is shown mounted in a conventional manner on a circular base 12. Radome 10 has been illustrated diagrammatically with the random disposition of its basic structural elements (indicated typically by the reference numeral 14) shown in simple line form. In actual practice, the structural elements 14 would be fabricated of a suitable material, as for example lightweight elongated tubular members interconnected by known conventional coupling means. Moreover, once completely assembled, the frame structure would be covered by either a continuous skin or individual panels. However, these features have been omitted in the drawings in order to place emphasis on the particular arrangement of structural elements.

As previously mentioned, in structures of this type a random disposition of structural elements is essential if the enclosed radar equipment is to function properly. Although at first glance the random disposition of structural elements in FIG. 1 appears not to be governed by any predetermined pattern, such is actually not the case. Rather, the structural elements are interconnected in accordance with a carefully developed standard random pattern which is repeated over the entire surface of the structure. This standard pattern, a more complete description of which will hereinafter be provided, is contained almost entirely within one of a plurality of large spherical equilateral triangular subdivisions 16, the sides 20 of which have been emphasized by heavier dotted lines in FIG. 1.

Figure 2:
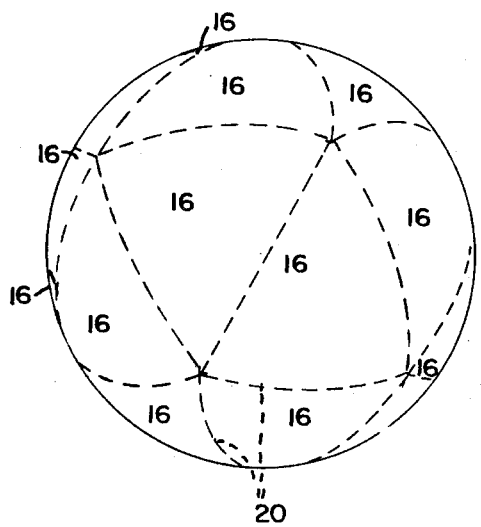
FIG. 2 is a view in perspective of a spherical body with its surface divided into a predetermined number of spherical equilateral triangular subdivisions.

The aforementioned standard random pattern (shown on an enlarged scale in FIG. 3) is geometrically developed by following a series of steps which will now be described in greater detail. The first of these steps involves subdividing the surface of the spherical structure into the aforementioned basic spherical equilateral triangular subdivisions 16. An illustration of this technique is provided by FIG. 2 which shows the surface of a typical spherical body 18 subdivided into equilateral triangles 16 by dotted lines 20. It is to be understood at this point that the large triangular areas 16 defined by heavy dotted lines 20 in FIG. 1 correspond to the identically numbered triangular subdivisions in FIG. 2. Spherically equilateral triangles 16 provide a basis for developing the standard pattern which will govern the ultimate random arrangement of individual structural elements. Thus it can be seen that once a standard pattern has been developed for one such basic triangular subdivision, the same pattern will apply equally as well to the remaining triangular subdivisions into which the surface of the spherical structure has been divided.

Figure 3:
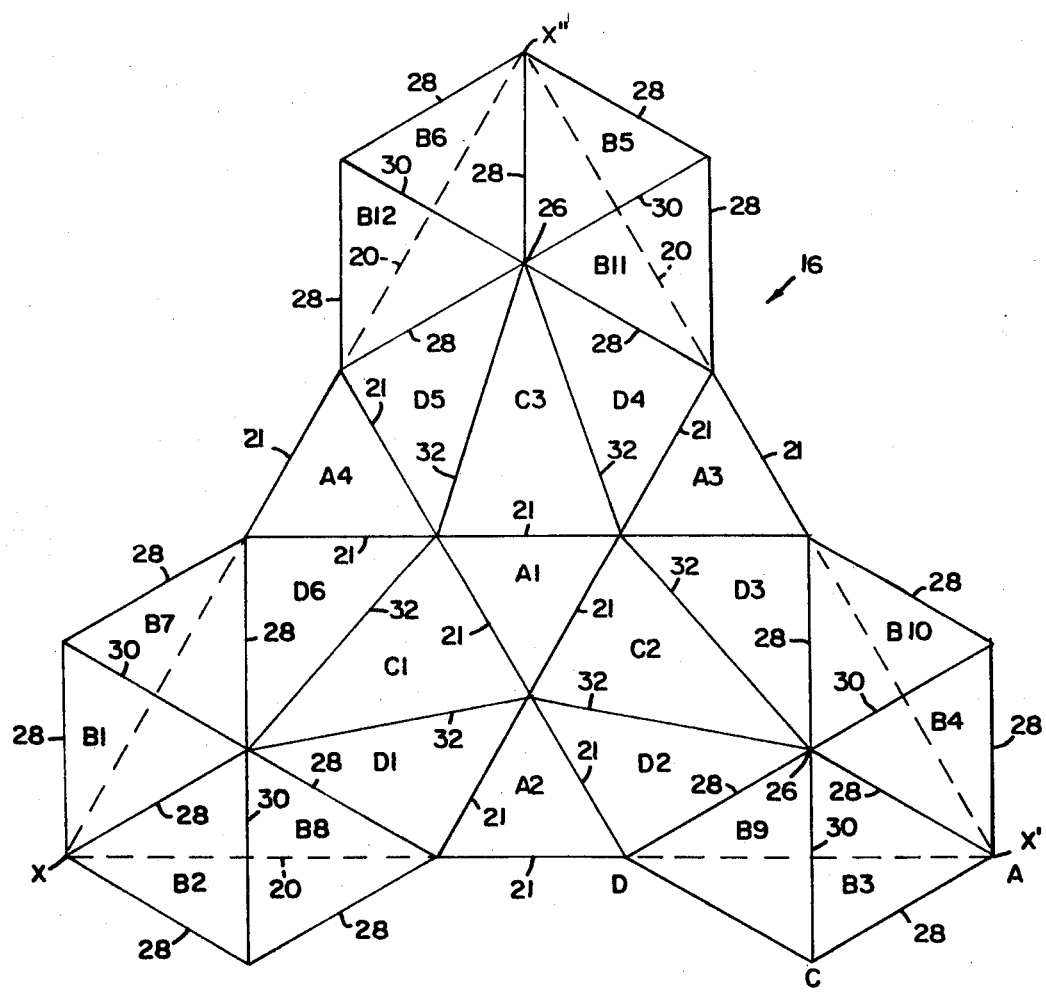
FIG. 3 is a diagrammatic illustration showing a random pattern established in accordance with the present invention.
Figure 4A:
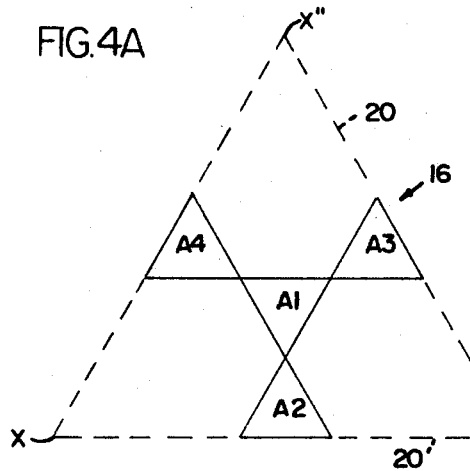
FIGS. 4A to 4F are diagrammatic illustrations depicting the series of successive steps followed in establishing the random pattern illustrated in FIG. 3.

In FIG. 3, one of the basic spherical triangular subdivisions 16 shown in FIG. 1 has been divorced from the remainder of the structure and shown alone with the standard pattern governing the random disposition of structural elements superimposed thereon. The same triangular subdivision 16 has been shown at various stages in the geometric development of this standard pattern in FIGS. 4A to 4F. Referring now to these drawings, triangular subdivision 16 is shown with sides 20 represented by dotted lines which intersect to form three vertexes X, X' and X". In FIG. 4A triangular subdivision 16 has been initially subdivided by the location therein of a smaller central equilateral triangle $A_1$ whose vertexes are connected to sides 20 of triangular subdivision 16 by identical equilateral triangles $A_2$, $A_3$ and $A_4$. Thus it can be seen that four identical equilateral triangles are positioned within triangular subdivision 16 in this initial step.

Figure 4B:
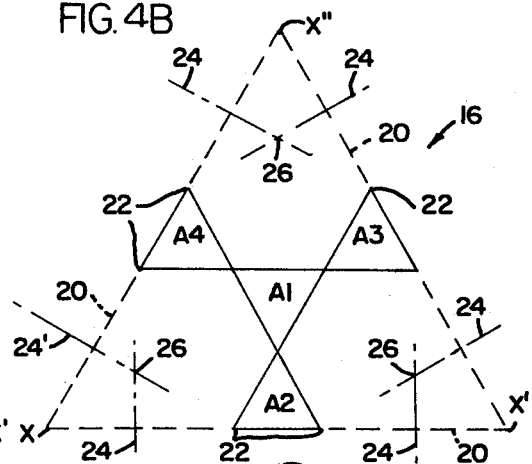
Figure 4C:
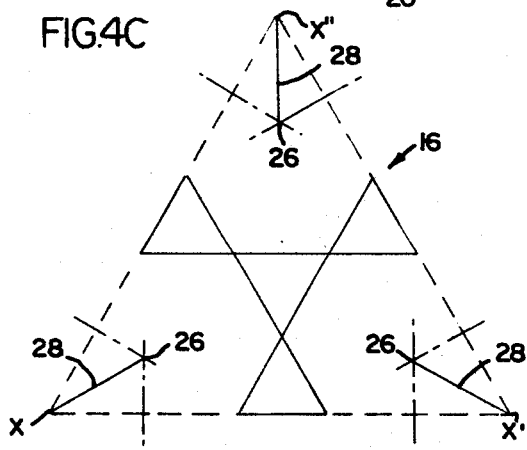

FIG. 4B represents the next step in the development of the standard pattern. As illustrated, the distances along sides 20 between vertexes X, X' and X" and the base vertexes 22 of equilateral triangles $A_2$, $A_3$, and $A_4$ are bisected by perpendicular lines 24 which intersect at points 26 within triangular subdivision 16. In FIG. 4C the next step in the development of the standard pattern is accomplished by connecting points 26 to the vertexes X, X' and X" with straight lines 28 of equal length.

Figure 4D:
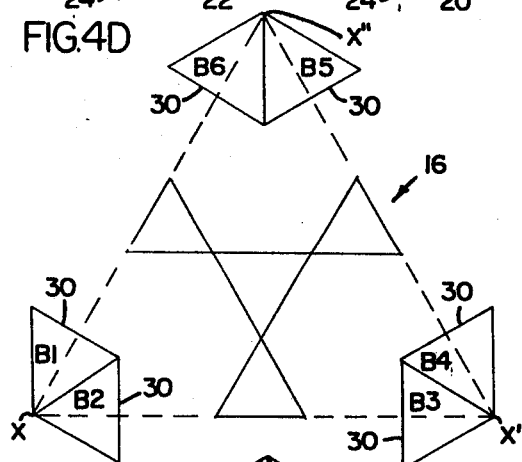
Figure 4E:
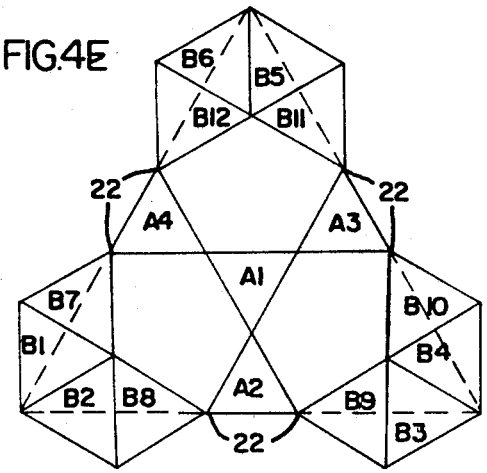

As shown in FIG. 4D, isosceles triangles $B_{1-6}$ are then developed about vertexes X, X' and X". These isosceles triangles each have two sides equal in length to lines 28 and slightly longer bases 30. It is to be understood that although the bases 30 appear equal in length to sides 28 in the drawings, this is merely a distortion created by projecting the basic spherical equilateral subdivision 16 on a flat surface. The next step as shown in FIG. 4E is to connect the base vertexes 22 of triangles $A_2$, $A_3$ and $A_4$ with the adjacent base vertexes of isosceles triangles $B_{1-6}$; thereby forming additional identical isosceles triangles $B_{7-12}$.

Since the bases of isosceles triangles $B_{7-12}$ are common to those of the adjacent isosceles triangles $B_{1-6}$, they are naturally of identical length. Thus it can be seen that twelve identical isosceles triangles $B_{1-12}$ are developed about the vertexes X, X' and X" of basic spherical equilateral subdivision 16.

Figure 4F:
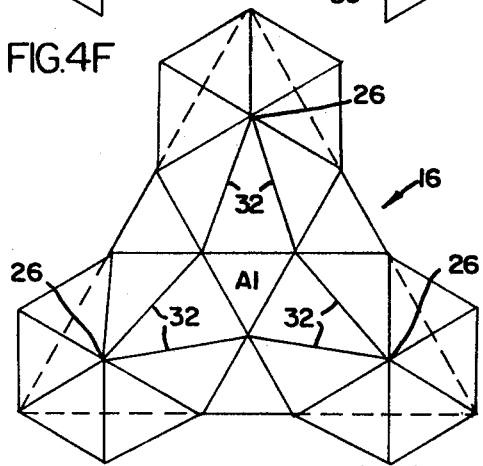
Figure 5A:
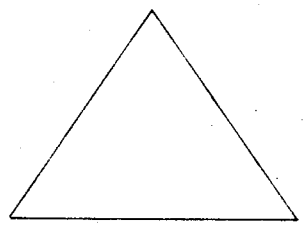
FIGS. 5A to 5D are illustrations showing the maximum number of triangular panels required to enclose the frame structure shown in FIG. 1.
Figure 5B:
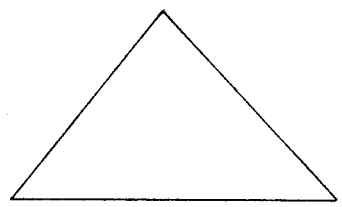
Figure 5C:
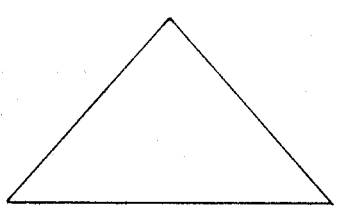
Figure 5D:
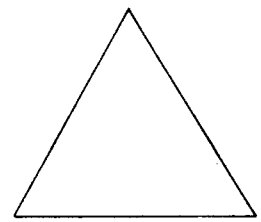

Finally, as shown in FIG. 4F, the vertexes of central equilateral triangle $A_1$ are connected to points 26 by lines 32 of equal length. As can best be seen in FIG. 3, this final step results in the formation of isosceles triangles $C_{1-3}$ and irregularly dimensioned triangles $D_{1-6}$. It should be noted at this point that the irregularly dimensioned triangles $D_1$, $D_3$ and $D_5$ are mirror image reproductions of irregularly dimensioned triangles $D_2$, $D_4$ and $D_6$.

Returning now to FIG. 3, a review of the advantages gained by use of the above-described pattern will now be provided. To begin with, by arranging structural elements along the lines defined by the sides of triangles A, B, C, and D, only four basic element lengths are required. The length of these different sized elements will be equal to sides 21, 28, 30 and 32. More particularly, all of the A triangles are equilateral and thus utilize sides 21 of the same length. The B triangles are isosceles and utilize two equal sides 28 and a slightly longer base 30. The C triangles are also isosceles and utilize equal sides 32 of bases 21 which incidentally also form sides of the equilateral A triangles. Finally, the irregularly dimensioned D triangles are formed by adjacent sides of the A, B and C triangles and consequently do not contribute to the total number of differently dimensioned elements required to make up the random pattern.

It should also be noted that where the triangular spaces between structural elements 14 are to be covered by individual triangular panels, a maximum of five different panels will be required as shown in FIG. 5. To explain, five different panel types are required where the panel material is provided with an interior finish which differs from that of the exterior. In such a case, differently dimensioned panels A, B and C must be provided together with irregularly dimensioned D panels (see FIG. 5), two sets of which must be provided to compensate for the aforementioned mirror image effect. However, where the panel material had identical finishes on both sides, only four different panel types (A, B, C and D) are required since the mirror image effect of the irregularly dimensioned D panels need not be compensated for.

This relatively low number of differently dimensioned structural elements is of significant importance both in the fabrication and subsequent construction of radome structures. More particularly, when fabricating differently dimensioned elements, jigs and fixtures must be designed for each element in order to facilitate mass production. By minimizing the number of differently dimensioned elements, a comparable reduction is realized in the various jigs and fixtures required, thereby giving rise to a substantial saving in tool costs. Moreover, the low number of differently dimensioned components facilitates subsequent shipment of a randome structure in a disassembled state. Finally, the task of assembling the randome structure at the construction site is considerably simplified by the reduction in number of differently dimensioned components. This is of considerable importance when one considers that most randome structures are assembled at remote construction sites, often under severe climatic conditions which predominate in arctic regions.

Although described in connection with randomes, it is to be understood that the invention applies to all types of spherical enclosures. It is our intention to cover all changes and modifications of the embodiment herein chosen for purposes of disclosure which do not depart from the spirit and scope of the invention.

We claim:
1. A generally spherical support structure comprising elongated structural elements arranged in re-occurring random geometric patterns, the elements in each said patterns cooperating to define a plurality of four basic triangular openings, the said elements having four basic lengths which are utilized repeatedly in said patterns.

2. The structure as set forth in claim 1 further characterized by only one of said triangular openings being equilateral.

3. A support structure having a generally spherical shape comprising the combination of elongated structural elements interconnected in re-occurring random geometric patterns, said element being limited to four standard lengths, the elements in each said patterns cooperating to define a plurality of triangular openings which openings are also limited to four basic configurations, only one of which is equilateral.

References Cited
UNITED STATES PATENTS

| | | | |
|---|---|---|---|
| 3,333,375 | 8/1967 | Johnston | 52—81 |
| 2,978,704 | 4/1961 | Cohen | 52—81 |
| 3,154,887 | 11/1964 | Schmidt | 52—81 |

FRANK L. ABBOTT, *Primary Examiner.*

C. G. MUELLER, *Assistant Examiner.*